US012160067B2

(12) United States Patent
Fernandes et al.

(10) Patent No.: US 12,160,067 B2
(45) Date of Patent: Dec. 3, 2024

(54) TERMINAL POSITION ASSURANCE DEVICE WITH SEALING

(71) Applicant: TE Connectivity Solutions GMBH, Schaffhausen (CH)

(72) Inventors: Stanrich Dwayne Fernandes, Harrisburg, PA (US); Emma L. Workman, Camp Hill, PA (US); David Swartz, York, PA (US); William G. Lindberg, Elizabethtown, PA (US); Vinayakumar Shettar, Mechanicsburg, PA (US); Richard C. Batley, III, York Springs, PA (US)

( * ) Notice: Subject to any disclaimer, the term of this patent is extended or adjusted under 35 U.S.C. 154(b) by 362 days.

(21) Appl. No.: 17/705,844

(22) Filed: Mar. 28, 2022

(65) Prior Publication Data

US 2023/0307866 A1 Sep. 28, 2023

(51) Int. Cl.
*H01R 13/52* (2006.01)

(52) U.S. Cl.
CPC ................................ *H01R 13/5219* (2013.01)

(58) Field of Classification Search
None
See application file for complete search history.

(56) References Cited

U.S. PATENT DOCUMENTS 9,160,097 B2 * 10/2015 Mori .................... H01R 13/521
9,614,305 B2 * 4/2017 Uchida .................. H01R 4/184
10,355,393 B2 * 7/2019 Yi ...................... H01R 13/5208

* cited by examiner

*Primary Examiner* — Ross N Gushi

(57) ABSTRACT

A terminal position assurance member for use with an electrical connector. The terminal position assurance member includes a rigid frame member and one or more compressible seals. The rigid frame member extends from a conduct receiving surface of the terminal position assurance member to a connector mating surface of the terminal position assurance member. The one or more compressible seals cooperate with the rigid frame member to provide sealing between the rigid frame member, a housing of the electrical connector and conductors inserted into the terminal position assurance member. Any insertion force applied to the conductor receiving surface of the rigid frame member will be translated through the rigid frame member to one or more terminals of the electrical connector, allowing the one or more seals to remain compressible to provide the sealing characteristics required.

17 Claims, 11 Drawing Sheets

TERMINAL POSITION ASSURANCE DEVICE WITH SEALING

FIELD OF THE INVENTION

The present invention relates to a terminal position assurance device which provides sealing. In particular, the terminal position assurance device has portions which are rigid and portions which are compressible.

BACKGROUND OF THE INVENTION

Terminal position assurance (TPA) devices are commonly used with electrical connectors to ensure that the terminals are properly positioned in the housing of the connector. The terminal position assurance device can also provide a visual indication that the mating connectors are fully and properly mated.

In one example, when two connectors are mated, the housings are pushed together after the contacts have been loaded. By design, if the contacts are only partially inserted into the housings, the two pieces of plastic cannot be pushed together. If the contact is so far back in the circuit cavity that plastic pieces can be pushed together, then a portion of the contact is left hanging out of the circuit cavity. In either case, the error is obvious and can easily be addressed.

In another more common design, the terminal position assurance is a separate plastic piece. The terminal position assurance device is inserted into the wire exit face of the connector after all the terminated contacts have been inserted and will latch in place onto the housing. If any contact is not fully seated into its respective circuit cavity, the terminal position assurance device will not fully latch onto the housing. This will alert the assembler to check for any unseated terminals. Once any unseated terminals are in place, the terminal position assurance device will fully latch onto the housing. The terminal position assurance device can provide some level of redundancy if, for any reason, the primary latching features fail.

While terminal position assurance devices are effective for ensuring that terminals are properly positioned, the terminal position assurance device does not provide sealing to prevent the ingress of water, dust or other unwanted contaminates. Known terminal position assurance devices are made from rigid materials to allow the terminal position assurance device to engage and move the terminals. The exclusive use of the rigid material does not allow the terminal position assurance device to compress or conform to the cavity or terminals, thereby providing no sealing function. When terminal position assurance devices are used in environments in which sealing is needed, one or more separate seals must be used to properly seal the housing and the terminals to prevent the ingress of water, dust or other unwanted contaminates. The use of individual components to provide terminal position assurance and sealing is expensive and creates inefficiencies in the manufacturing process.

It is therefore desirable to provide a terminal position assurance device which provides sealing, and which can be assembled to the connector housing as one component. The terminal position assurance device must have portions which are rigid and portions which are compressible.

SUMMARY OF THE INVENTION

An embodiment is directed to a terminal position assurance member for use with an electrical connector. The terminal position assurance member includes a rigid frame member and one or more compressible seals. The rigid frame member extends from a conduct receiving surface of the terminal position assurance member to a connector mating surface of the terminal position assurance member. The one or more compressible seals cooperate with the rigid frame member to provide sealing between the rigid frame member, a housing of the electrical connector and conductors inserted into the terminal position assurance member. Any insertion force applied to the conductor receiving surface of the rigid frame member will be translated through the rigid frame member to one or more terminals of the electrical connector, allowing the one or more seals to remain compressible to provide the sealing characteristics required.

Other features and advantages of the present invention will be apparent from the following more detailed description of the illustrative embodiment, taken in conjunction with the accompanying drawings which illustrate, by way of example, the principles of the invention.

BRIEF DESCRIPTION OF THE DRAWINGS

FIG. 3 is a perspective view of the illustrative terminal position assurance member of FIG. 2 illustrating a seal block housing with an interface seal and a rear seal exploded there from.

DETAILED DESCRIPTION OF THE INVENTION

Figure 1:
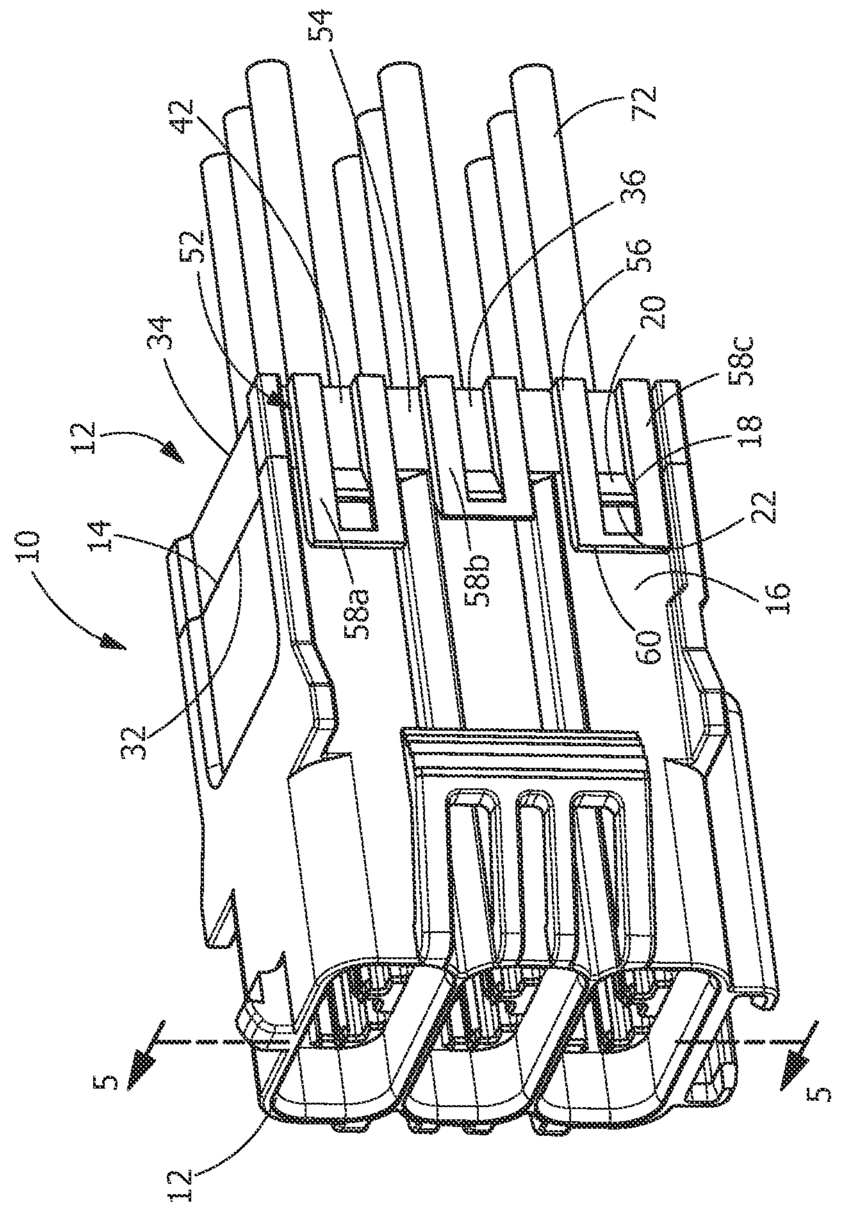
FIG. 1 is a perspective view of an illustrative electrical connector with an illustrative terminal position assurance member according to the present attached thereto, the terminal position assurance member is shown in a final latch position.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

Moreover, the features and benefits of the invention are illustrated by reference to the preferred embodiments. Accordingly, the invention expressly should not be limited to such embodiments illustrating some possible non-limiting combination of features that may exist alone or in other combinations of features, the scope of the invention being defined by the claims appended hereto.

Referring to FIGS. 1 through 6, a first illustrative embodiment of a terminal position assurance member 30 is shown for use with an illustrative electrical connector 10. The electrical connector 10 has a mating face 12 and an oppositely facing terminal receiving face 14. Side surfaces 16 extend between the mating face 12 and the terminal receiving face 14. Terminal position assurance receiving latching projections 18 are provided on the side surfaces 16. The terminal position assurance receiving latching projections 18 have sloped lead in surfaces 20 and latching shoulders 22. The latching shoulders 22 extend at approximately ninety degrees from the side surfaces 16. The electrical connector 10 shown in FIGS. 1 through 6 is meant to be illustrative, as other embodiments of the electrical connector can be used without departing from the scope of the invention.

Figure 2:
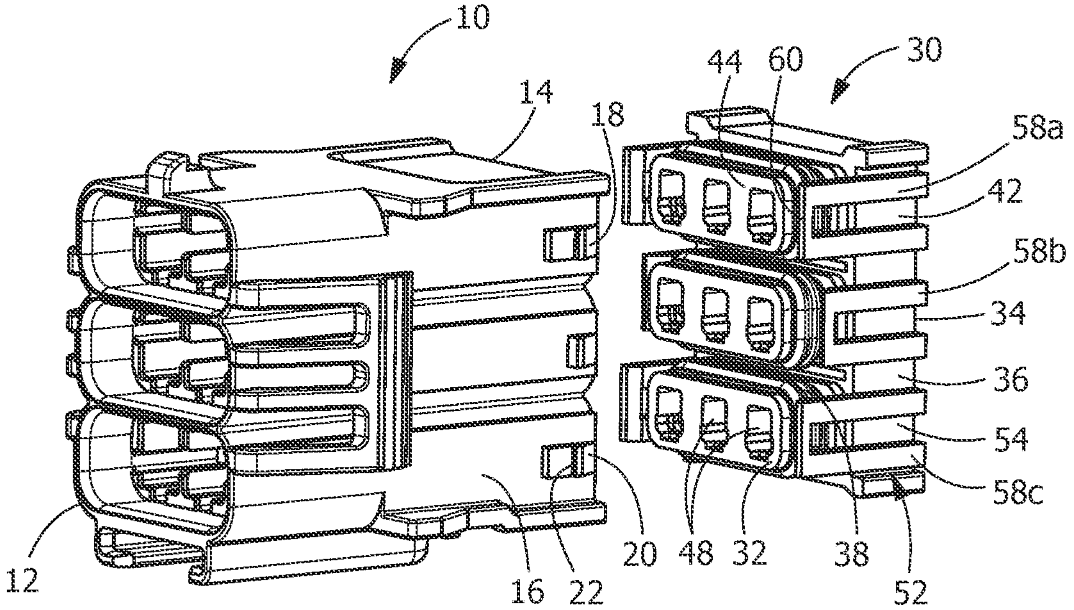
FIG. 2 is a perspective view of the electrical connector of FIG. 1 with the terminal position assurance member exploded therefrom.
Figure 3:
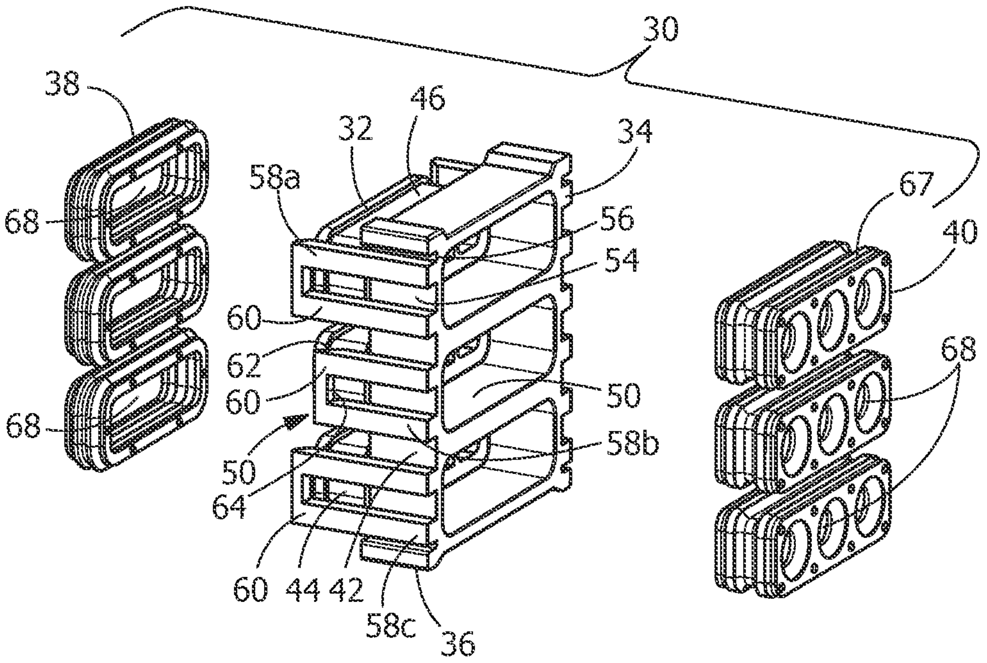

As shown in FIGS. 2 and 3, the illustrative terminal position assurance member 30 has connector mating surface 32 and an oppositely facing conductor receiving surface 34. The terminal position assurance member 30 includes a seal block or rigid frame member 36, one or more interface seals 38 and one or more rear seals 40.

In the illustrative embodiment shown in FIG. 3, the seal block 36 has a main body portion 42 with terminal receiving projections 44 extending to the connector mating surface 32. The seal block 36 is made from resin or other material which remains stiff when a compressive force is applied thereto.

In the embodiment shown, three terminal receiving projections 44 are provided. Interface seal receiving recesses 46 extending around the outer periphery of each of the terminal receiving projections 44. Terminal receiving passages 48 extend through each of the terminal receiving projections 44. In the embodiment shown, three terminal receiving passages 48 are provided in each terminal receiving projections 44. However, other numbers and configurations of the terminal receiving projections 44 may be used.

Rear seal receiving recesses 50 extend from the terminal receiving projections 44 to the conductor receiving surface 34. In the embodiment shown, three rear seal receiving recesses 50 are provided. However, other numbers and configurations of the rear seal receiving recesses 50 may be used.

Latches 52 extend from side surfaces 54 of the seal block 36. In the illustrative embodiment, the latches 52 have mounting sections 56 which are secured to the seal block 36 proximate the conductor receiving surface 34. The latches 52 have resilient arms 58 which extend from the mounting sections 56 to latch projection securing sections 60. The latch projection securing sections 60 have sloped lead in surfaces 62 and latching shoulders 64. The latching shoulders 64 extend at approximately ninety degrees from the resilient arms 58. In the illustrative embodiment shown, the resilient arms 58*a* and 58*c* and longer than the latching arms 58*b*.

The interface seals 38 are configured to cooperate with the terminal receiving projections 44. The interface seals 38 are made from a compressible material, such as, but not limited to silicon. Each interface seal 38 has an opening 66(FIG. 3) which is dimensioned to fit tightly over a respective terminal receiving projections 44 to provide a watertight seal between the terminal receiving projections 44 and the interface seal 38. The outside perimeters of the interface seals 38 are dimensioned to be received in the electrical connector 10 and cooperate with walls of cavities in the electrical connector to provide a watertight seal between the terminal walls of the cavities and the interface seal 38. The number of interface seals 38 is equal to the number of terminal receiving projections 44.

The rear seals 40 are configured to be inserted into the rear seal receiving recesses 50. The rear seals 40 are made from a compressible material, such as, but not limited to silicon. As shown in FIG. 3, each rear seal 40 has outside surface 67 which is dimensioned to cooperate with walls of rear seal receiving recesses 50 to provide a watertight seal between the walls of rear seal receiving recesses 50 and the rear seal 40. Conductor receiving openings 68 are provided in the rear seals 40. The conductor receiving openings 68 have ribs 70 (FIG. 5) which cooperate with the conductors 72 to provide a watertight seal between the conductors 72 and the rear seal 40. The number of rear seals 40 is equal to the number of rear seal receiving recesses 50.

Figure 4:
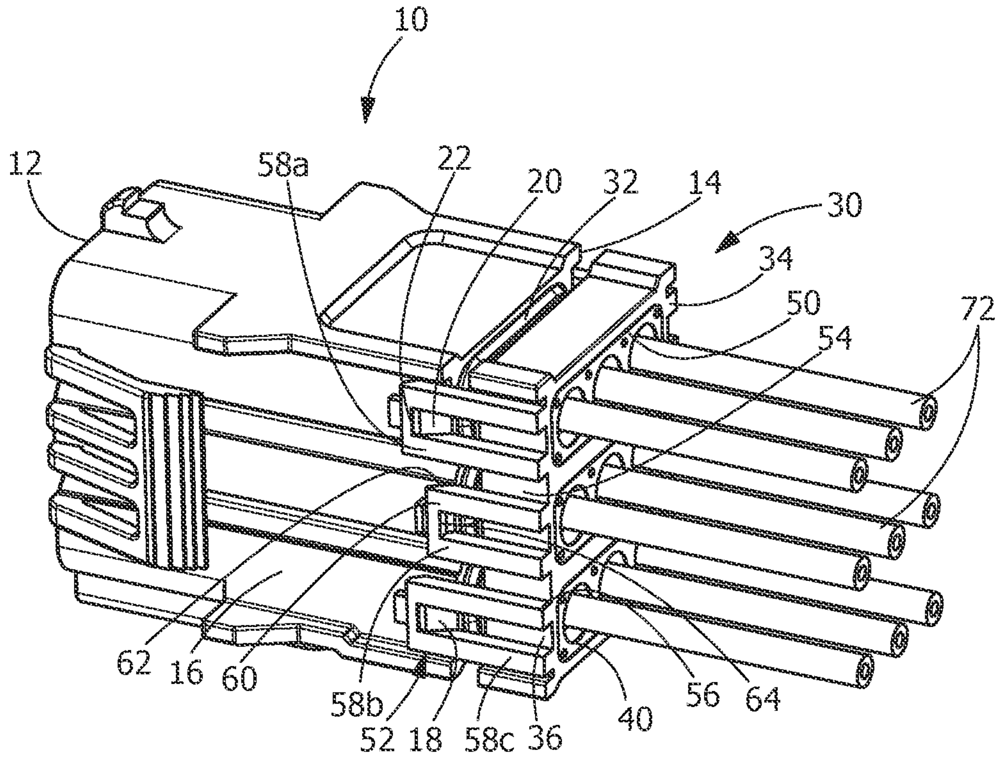
FIG. 4 is a perspective view of the illustrative connector housing of FIG. 1, with the terminal position assurance member shown in an initial latch position.

In use, the terminal position assurance member 30 is initially provided in the initial latch position, as shown in FIG. 4. In this position, the latch projection securing sections 60 of the resilient arms 58*a* and 58*c* of latches 52 extend beyond the terminal position assurance receiving latching projections 18, thereby allowing the latching shoulders 64 of the latch projection securing sections 60 to cooperate with the latching shoulders 22 of the terminal position assurance receiving latching projections 18 to prevent the removal of the terminal position assurance member 30 from the electrical connector 10. Also in this position, the latch projection securing sections 60 of the resilient arms 58*b* of latches 52 cooperates with the sloped lead in surfaces 20 of the terminal position assurance receiving latching projections 18 to prevent the unwanted movement of the terminal position assurance member 30 from the initial latch position (FIG. 4) to the final latch position (FIG. 1).

Figure 6:
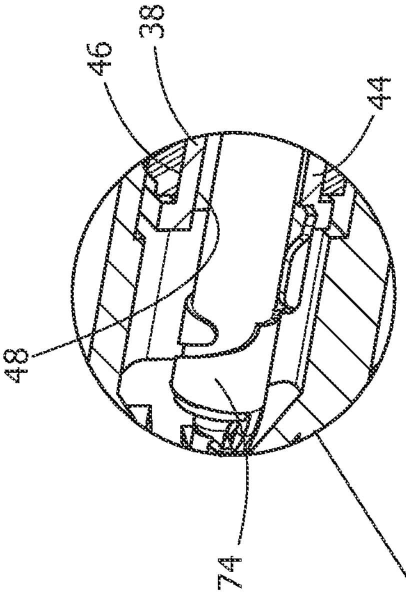
FIG. 6 is an enlarged cross-sectional view of the area 6 of FIG. 5.
Figure 5:
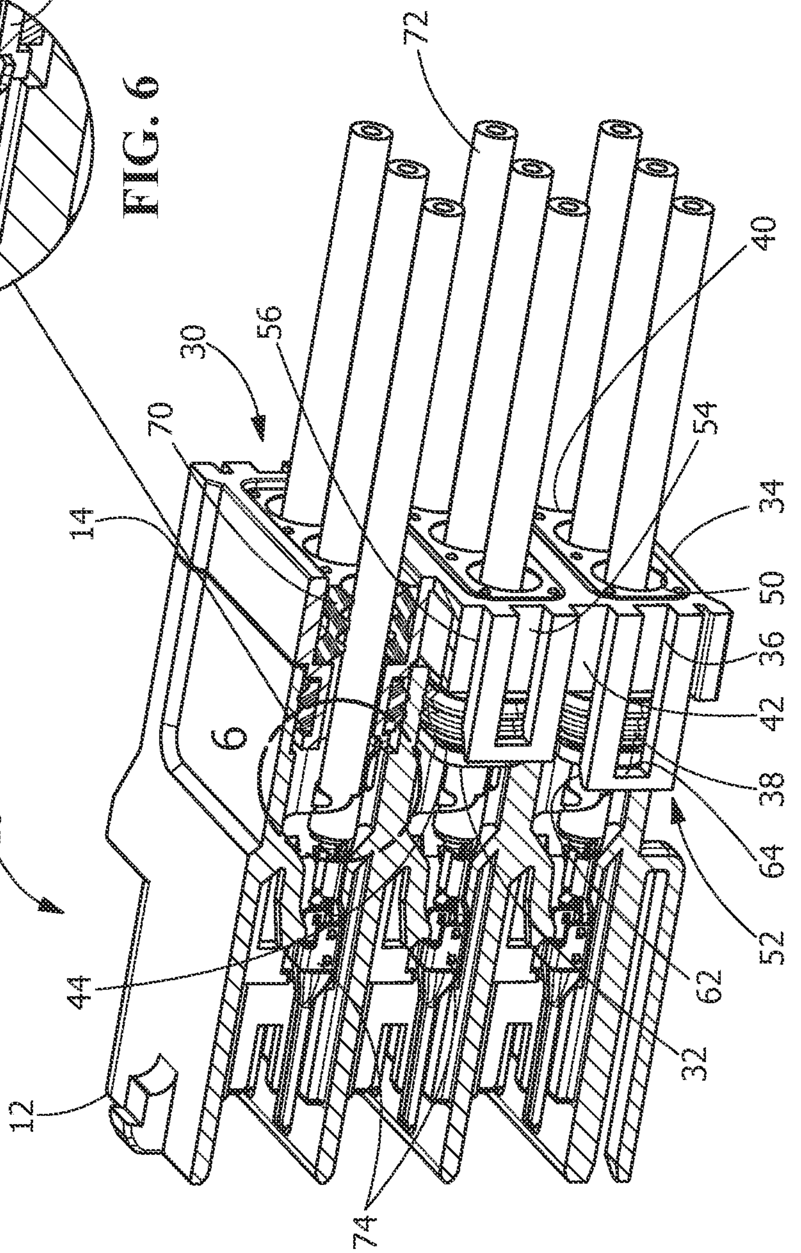
FIG. 5 is a partial cross-sectional view of the illustrative electrical connector taken along line 5-5 of FIG. 1.

With the terminal position assurance member 30 in the initial latch position, the terminals 74 and conductors 72 are inserted through the conductor receiving openings 68 of the rear seals 40 and through the terminal receiving passages 48 of the terminal receiving projections 44. The terminal position assurance member 30 is then moved to the final latch position, as shown in FIGS. 1, 5 and 6. As this occurs, the connector mating surface 32 of the terminal receiving projections 44 will engage the terminals 74 to ensure that the terminals 74 are properly positioned in the electrical connector 10. If the terminals 74 are not properly positioned, the rigid connector mating surface 32 will engage portions of the terminals 74 to properly positioned the terminals 74 in the connector 10. As the rigid seal block 36 extends from the conductor receiving surface 34 to the connector mating surface 32, any force applied to the conductor receiving surface 34 will be translated through the rigid seal block 36 to the connector mating surface 32 and to the terminal 72. As the forces are translated through the rigid seal block 36, the interface seals 38 and rear seals 40 remain compressible to provide the sealing characteristics required. Consequently, the terminal position assurance member 30 provides the rigidity required to properly position the terminals 74, while providing the sealing characteristic required to prevent the ingress of water, dust or other unwanted contaminates.

With the terminals 74 properly positioned, the terminal position assurance member 30 is secured in the final latch position by the cooperation of the latch projection securing sections 60 of the resilient arms 58*b* of latches 52 with the latching shoulders 22 of the terminal position assurance receiving latching projections 18. This provides a visual indication that the terminals 71 and the terminal position assurance member 30 are properly positioned. If the terminals 74 cannot be properly positioned, the terminal position assurance member 30 cannot be moved to the final latch position, providing a visual indication that the terminals 74 are not properly positioned.

A second illustrative embodiment a terminal position assurance member 130 for use with an illustrative connector 110 is shown in FIGS. 8 through 13. The electrical connector 110 has a mating face 112 and an oppositely facing terminal receiving face 114. Side surfaces 116 extend between the mating face 112 and the terminal receiving face 114. Terminal position assurance receiving latching projections 118 are provided on the side surfaces 116. The terminal position assurance receiving latching projections 118 have sloped lead in surfaces 120 and latching shoulders 122. The latching shoulders 122 extend at approximately ninety degrees from the side surfaces 116. The electrical connector 110 is meant to be illustrative, as other embodiments of the electrical connector can be used without departing from the scope of the invention.

Figure 8:
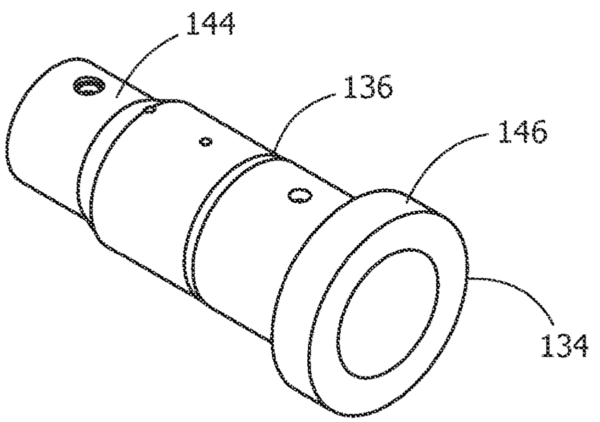
FIG. 8 is a perspective view of a rigid skeleton of the terminal position assurance member of FIG. 7.
Figure 9:
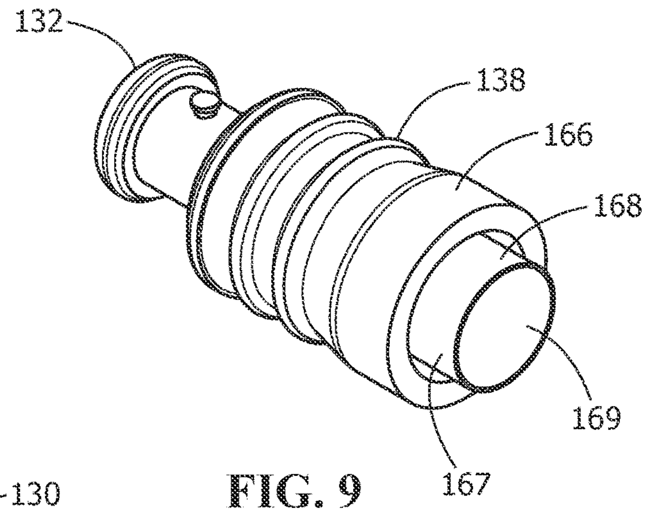
FIG. 9 is a perspective view of a flexible seal of the terminal position assurance member of FIG. 7.
Figure 10:
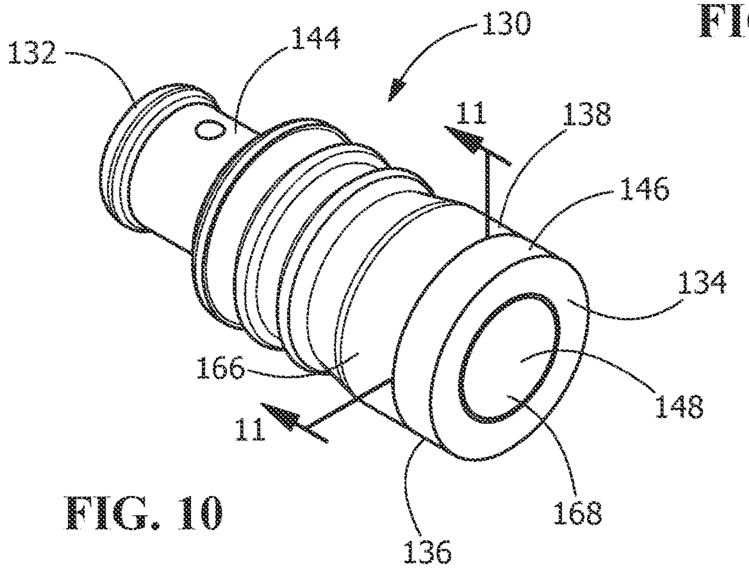
FIG. 10 is a perspective view of the assembled terminal position assurance member of FIG. 7.
Figure 11:
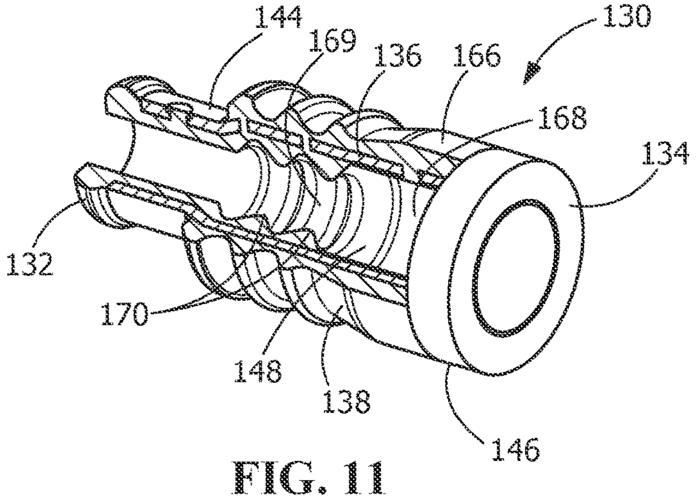
FIG. 11 is a cross-sectional view taken along line 11-11 of FIG. 10.

As shown in FIGS. 8 through 10, the illustrative terminal position assurance member 130 has connector mating surface 132 and an oppositely facing conductor receiving surface 134. Each terminal position assurance member 130 includes a rigid frame member 136 and a seal 138. A push member 140 is also provided to cooperate with one or more terminal position assurance members 130.

In the illustrative embodiment shown, the rigid frame member 136 extends from proximate the connector mating surface 132 to the conductor receiving surface 134. The rigid frame member 136 is made from resin or other material which remains stiff when a compressive force is applied thereto.

In the embodiment shown, the rigid frame member 136 has a crimping portion 144 provided proximate the connector mating surface 132 and an enlarged shoulder 146 provided proximate the conductor receiving surface 134. A terminal receiving passage 148 extends through the rigid frame member 136 from the connector mating surface 132 to the conductor receiving surface 134.

The seal 138 is configured to cooperate with the rigid frame member 136. The seal 138 is made from a compressible material, such as, but not limited to silicon. As shown in FIG. 9, the seal 138 has an outer portion 166 and an inner portion 168. The outer portion 166 is positioned about the outer circumference of a portion of the rigid frame member 136. The outer portion 166 of the seal 138 is dimensioned to fit tightly over the rigid frame member 136 to provide a watertight seal between the rigid frame member 136 and the seal 138. The outside perimeter of the outer portion 166 of the seal 138 is dimensioned to be received in the electrical connector 110 and cooperate with walls of cavities in the electrical connector to provide a watertight seal between the terminal walls of the cavities and the seal 138.

The inner portion 168 of the seal 138 is configured to be positioned in the terminal receiving passage 148 of the rigid frame member 136. The inner portion 168 has outside surface (FIG. 9) which is dimensioned to cooperate with the wall of terminal receiving passage 148 to provide a watertight seal between the wall of terminal receiving passage 148 and the inner portion 168 of the seal 138. Conductor receiving openings 169 are provided in the inner portion 168 of the seal 138. The conductor receiving openings 169 have ribs 170 (FIGS. 11 and 13) which cooperate with the conductors 172 to provide a watertight seal between the conductors 172 and the inner portion 168 of the seal 138.

The seal 138 may be positioned on the rigid frame member 136 by a two-stage molding process. Other methods of manufacture, such as, but not limited to, co-molding may also be used.

The push member 140 (FIG. 7) has an engagement portion 180 having slots 182 for receiving conductors 172 thereon. The number of slots 182 will vary depending upon the configuration of the electrical connector 110 and the number of terminals 174 to be inserted.

Latches 152 extend from side surfaces 154 of the push member 140. In the illustrative embodiment, the latches 152 have mounting sections 156 which are secured to the engagement portion 180. The latches 152 have resilient arms 158 which extend from the engagement portion 180 to latch projection securing sections 160. The latch projection securing sections 160 have latching shoulders 164. The latching shoulders 164 extend at approximately ninety degrees from the resilient arms 158.

Figure 7:
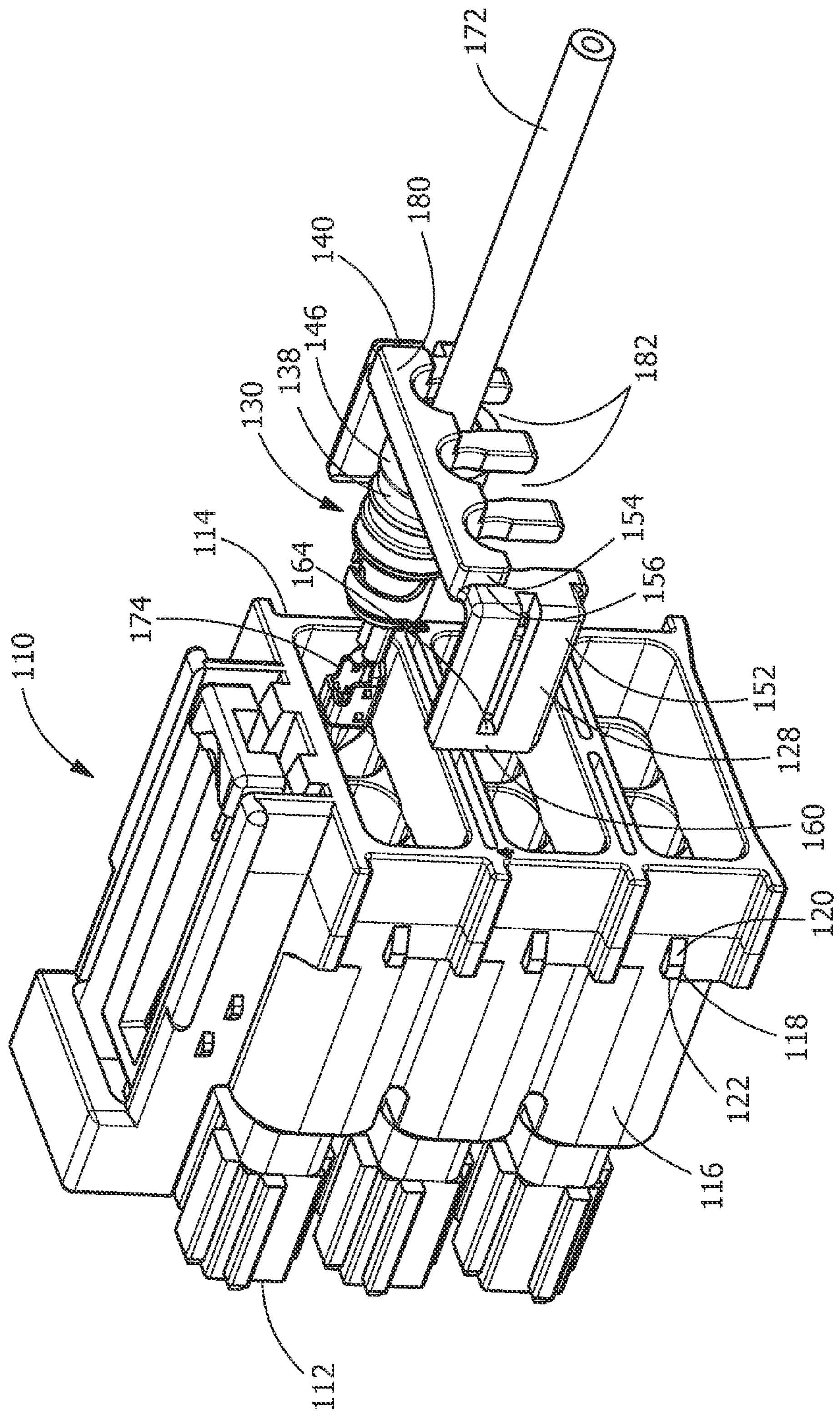
FIG. 7 is a perspective view of a second illustrative electrical connector with a second illustrative terminal position assurance member according to the present attached exploded therefrom, a single terminal position assurance member for one individual wire is shown.
Figure 12:
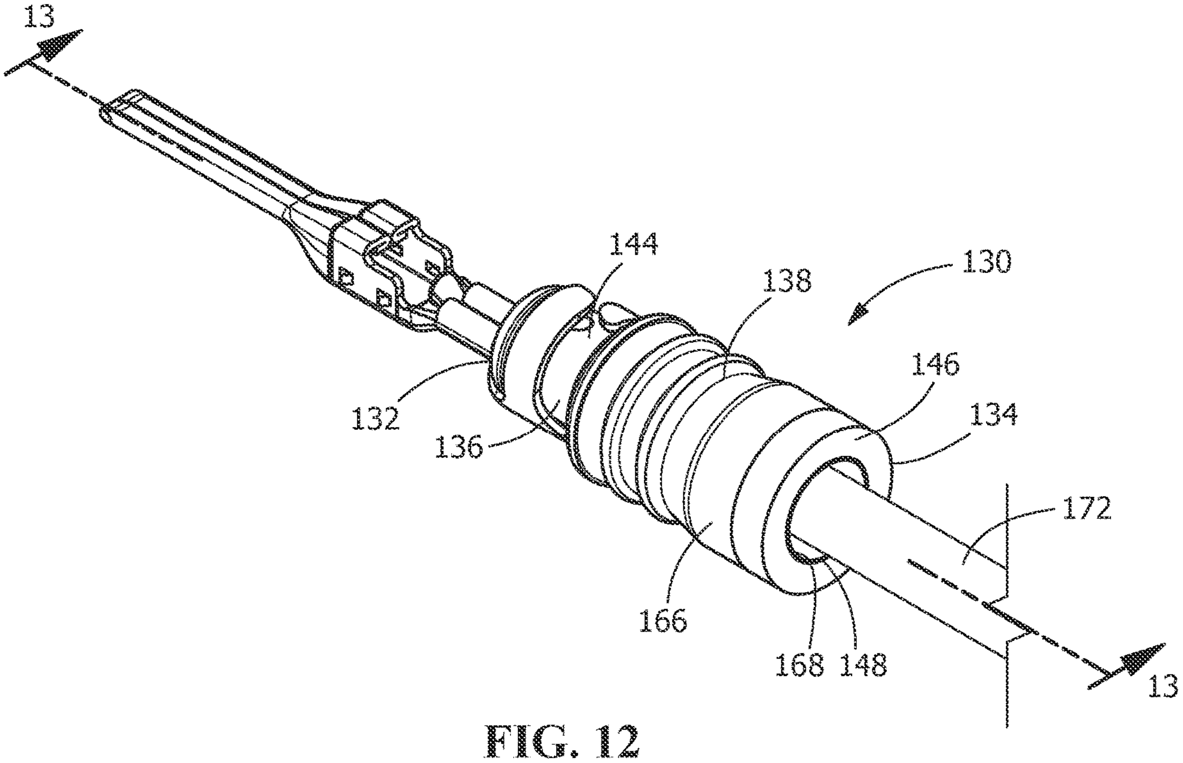
FIG. 12 is a perspective view of the illustrative connector housing of FIG. 7, with the terminal position assurance member shown in a fully assembled position.
Figure 13:
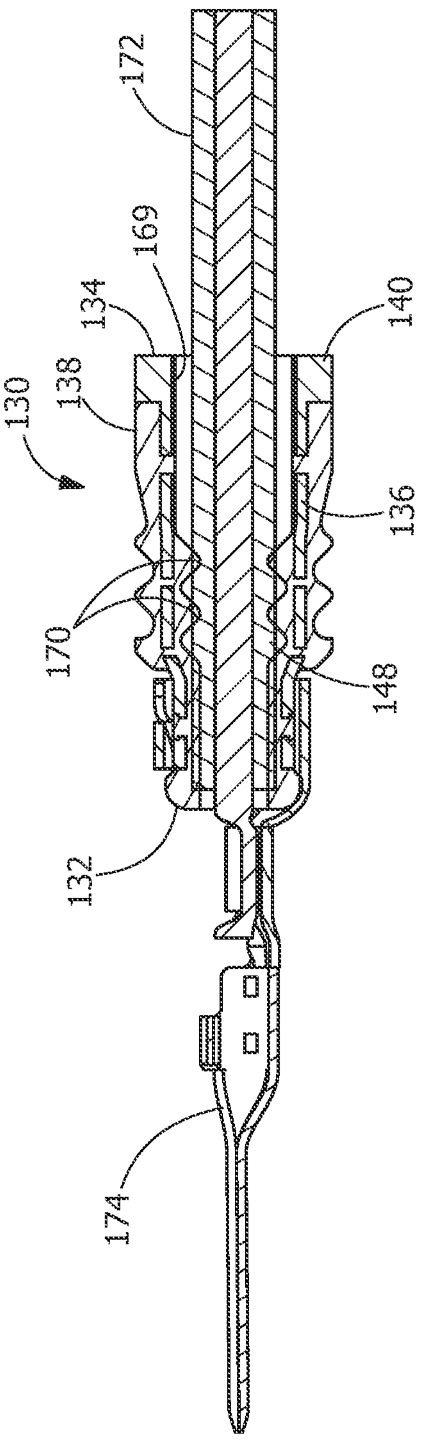
FIG. 13 is a cross-sectional view of the illustrative electrical connector taken along line 13-13 of FIG. 12.

In use, the terminal 174 is crimped to the crimping portion 144 of the rigid frame member 136 of the terminal position assurance member 130, as shown in FIG. 12. With the terminal 174 attached to the terminal position assurance member 130, the terminals 174 and conductor 172 are inserted into the electrical connector 110, as shown in FIG. 7. With the terminal 174 properly positioned, the push member 140 is moved into engagement with the terminal position assurance member 130. In this position, the conductor 172 is positioned in the slots 182 of the engagement portion 180. As an insertion force is applied to the engagement portion 180 of the push member 140, the connector mating surface 132 of the enlarged shoulder 146 of the rigid frame member 136 engages the push member 140. As the rigid frame member 136 extends from the conductor receiving surface 134 to the terminal 174, any force applied to the push member 140 will be translated through the rigid frame member 136 to the terminal 174. As the forces are translated through the rigid frame member 136, the seal 138 remains compressible to provide the sealing characteristics required.

With the terminal 174 and the terminal position assurance member 130 fully inserted, the latch projection securing sections 160 of the resilient arms 158 of latches 152 extend beyond the terminal position assurance receiving latching projections 118, thereby allowing the latching shoulders 164 of the latch projection securing sections 160 to cooperate with the latching shoulders 122 of the terminal position assurance receiving latching projections 118 to prevent the removal of the terminal position assurance member 130 from the electrical connector 110.

As the rigid frame member 136 extends from the conductor receiving surface 134 to proximate the connector mating surface 132, any force applied to the conductor receiving surface 134 will be translated through the rigid frame member 136 to the terminal 174 which is attached to the rigid frame member 136. As the forces are translated through the rigid frame member 136, the seal 138 remains compressible to provide the sealing characteristics required. Consequently, the terminal position assurance member 130 provides the rigidity required to properly position the terminals 174, while providing the sealing characteristic required to prevent the ingress of water, dust or other unwanted contaminates.

A third illustrative embodiment a terminal position assurance member 230 for use with an illustrative connector 210 is shown in FIGS. 14 through 18. The electrical connector 210 has a mating face 212 and an oppositely facing terminal receiving face 214. Side surfaces 216 extend between the mating face 212 and the terminal receiving face 214. Terminal position assurance receiving latching projections 218 are provided on the side surfaces 216. The terminal position assurance receiving latching projections 218 have sloped lead in surfaces 220 and latching shoulders 222. The latching shoulders 222 extend at approximately ninety degrees from the side surfaces 216. The electrical connector 210 is meant to be illustrative, as other embodiments of the electrical connector can be used without departing from the scope of the invention.

Figure 14:
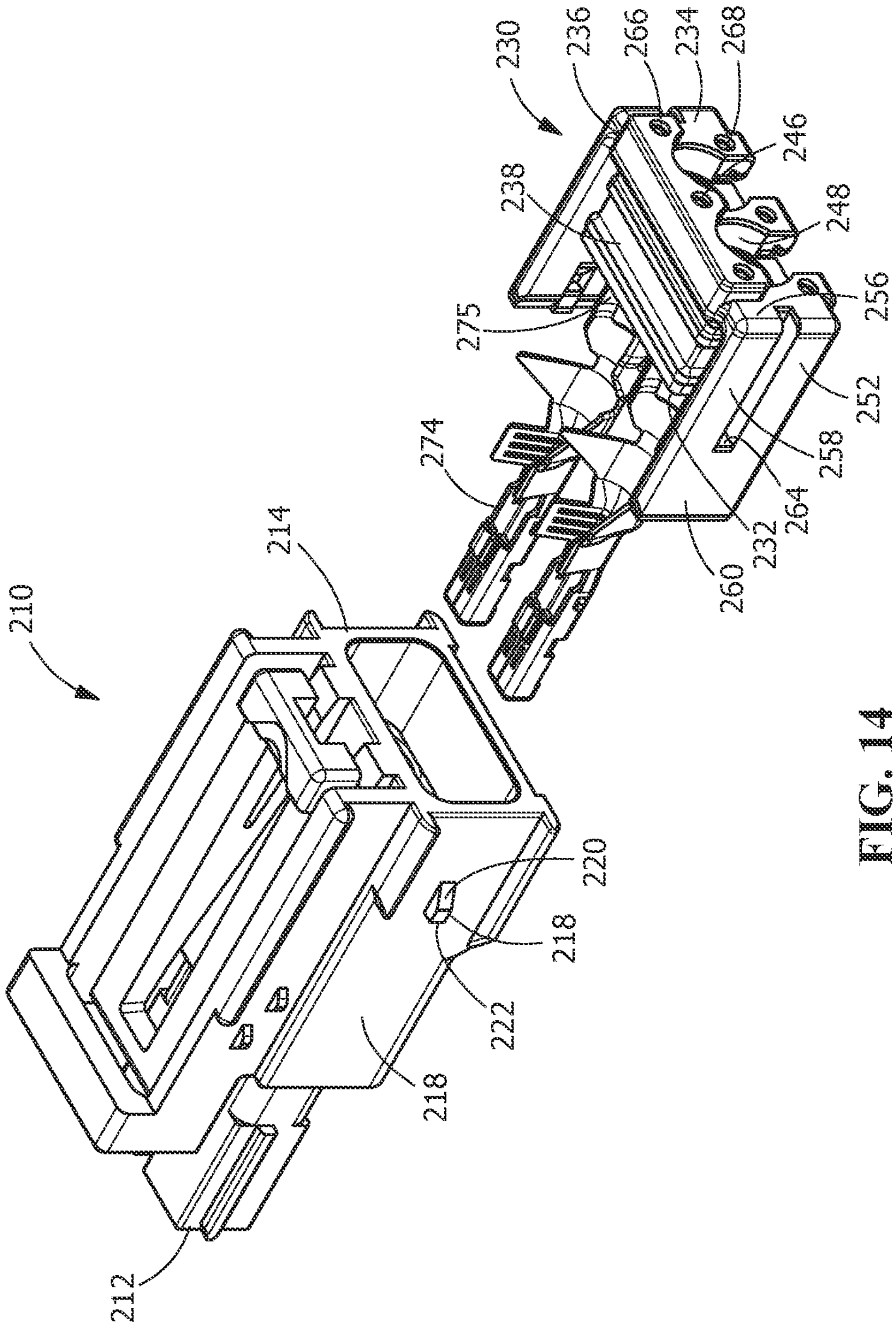
FIG. 14 is a perspective view of a third illustrative electrical connector with a third illustrative terminal position assurance member according to the present attached exploded therefrom.
Figure 15:
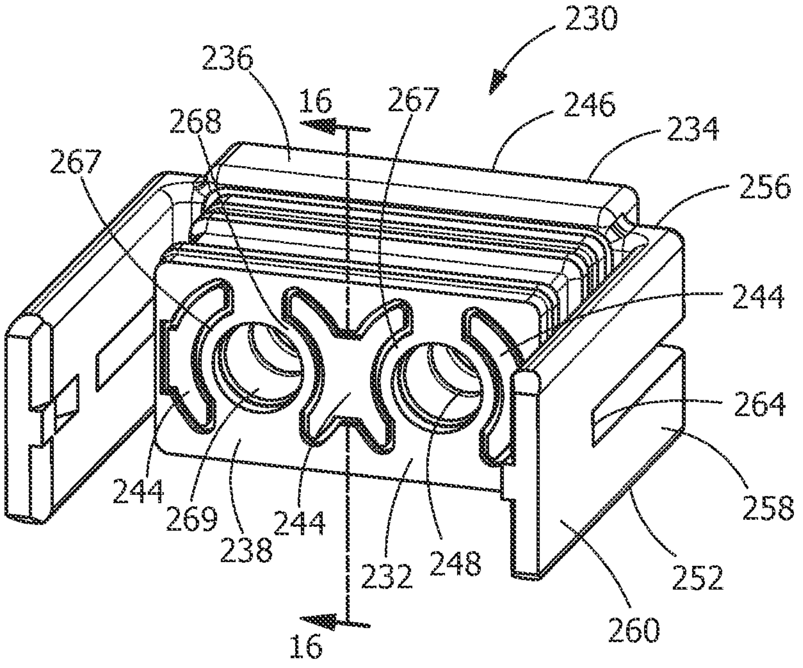
FIG. 15 is perspective view of the terminal position assurance member of FIG. 14.
Figure 16:
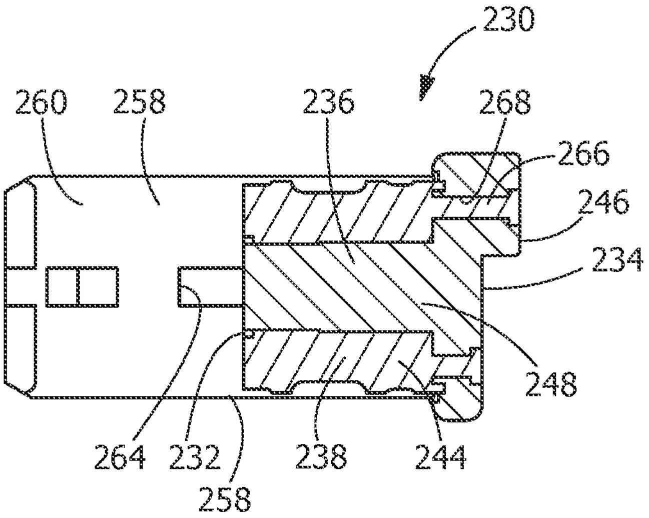
FIG. 16 is a cross-sectional view taken along line 16-16 of FIG. 15.
Figure 17:
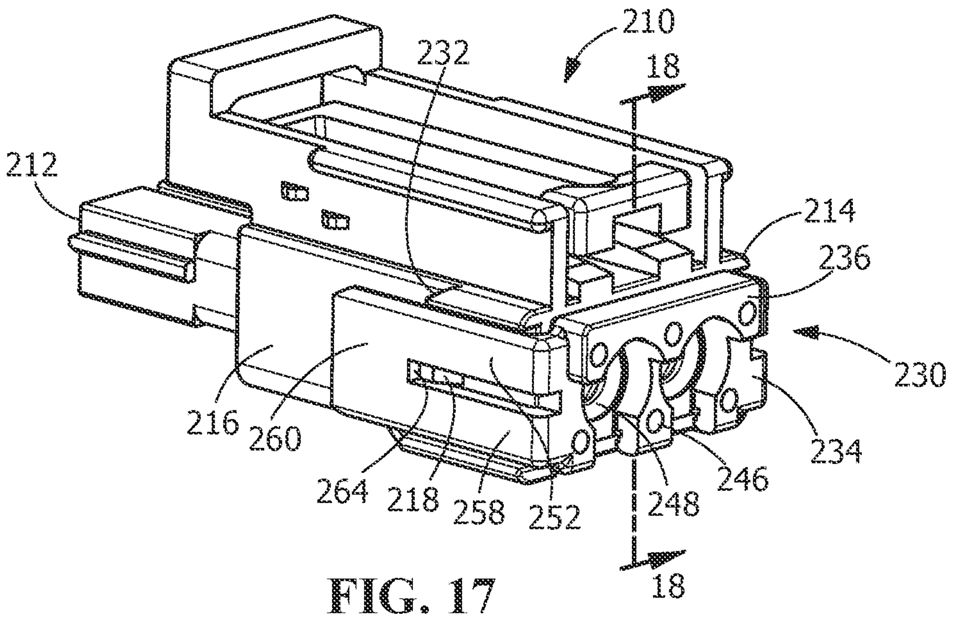
FIG. 17 is a perspective view of the illustrative connector housing of FIG. 14, with the terminal position assurance member shown in a fully assembled position.

As shown in FIGS. 14 through 16, the illustrative terminal position assurance member 230 has connector mating surface 232 and an oppositely facing conductor receiving surface 234. Each terminal position assurance member 230 includes a rigid frame member 236 and a seal 238.

In the illustrative embodiment shown, the rigid frame member 236 extends from the connector mating surface 232 to the conductor receiving surface 234. The rigid frame member 236 is made from resin or other material which remains stiff when a compressive force is applied thereto.

In the embodiment shown, the rigid frame member 236 has terminal engaging portions 244 which extend to the connector mating surface 232 and a push portion 246 extending from the conductor receiving surface 234. A terminal receiving passage 248 extends through the rigid frame member 236 from the connector mating surface 232 to the conductor receiving surface 234.

The seal 238 is configured to cooperate with the rigid frame member 236. The seal 238 is made from a compressible material, such as, but not limited to, silicon. In the embodiment shown, the seal 238 is over molded over the terminal engaging portions 244. The seal 238 also has retention members 266 which extend into opening 268 of the push portion 246.

The seal 238 is dimensioned to fit tightly over the rigid frame member 236 to provide a watertight seal between the rigid frame member 236 and the seal 236. The outside perimeter of the seal 238 is dimensioned to be received in the electrical connector 210 and cooperate with walls of cavities in the electrical connector to provide a watertight seal between the terminal walls of the cavities and the seal 238.

Terminal receiving passage portions 268 (FIG. 15) of the seal 238 are configured to be positioned in the terminal receiving passages 248 of the rigid frame member 236. The terminal receiving passage portions 268 have outside surfaces 267 which are dimensioned to cooperate with the walls of terminal receiving passages 248 to provide a watertight seal between the walls of terminal receiving passages 248 and the terminal receiving passage portions 268 of the seal 238. Conductor receiving openings 269 are provided in the terminal receiving passage portions 268 of the seal 238. The conductor receiving openings 269 have ribs 270 (FIG. 18) which cooperate with the conductors (not shown) to provide a watertight seal between the conductors and the terminal receiving passage portions 268 of the seal 238.

The seal 238 may be positioned on the rigid frame member 236 by a co-molding process. Other methods of manufacture, such as, but not limited to, two stage molding may also be used.

Latches 252 extend from the push portion 246. In the illustrative embodiment, the latches 252 have mounting sections 256 which are secured to the push portion 246. The latches 252 have resilient arms 258 which extend from the push portion 246 to latch projection securing sections 260 with latching shoulders 264. The latching shoulders 264 extend at approximately ninety degrees from the resilient arms 258.

Figure 18:
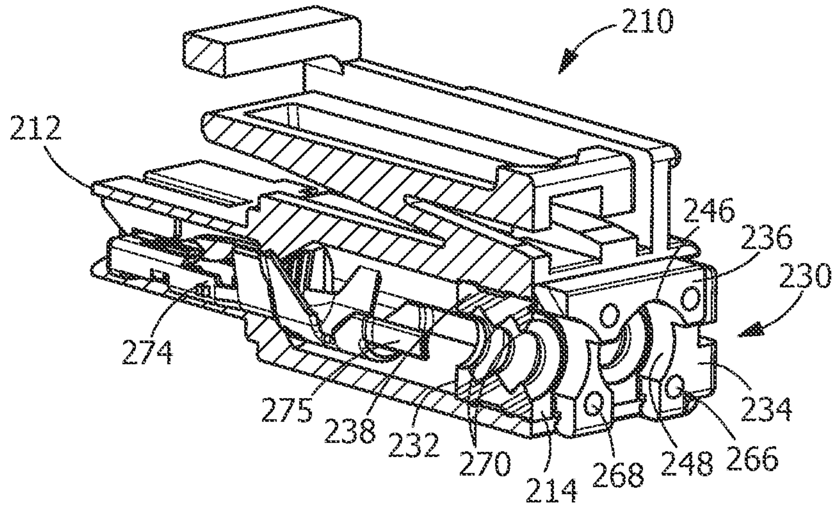
FIG. 18 is a cross-sectional view of the illustrative electrical connector taken along line 18-18 of FIG. 17.

In use, the terminals 274 with terminal lances 275 which are terminated to the conductors are inserted into the electrical connector 210, as shown in FIG. 18. With the terminals 274 properly positioned, the terminal engaging portions 244 of the rigid frame member 236 is moved into engagement with the terminal lances 275 of the terminals 274. As an insertion force is applied to the push portion 246 of the rigid frame member 236, the terminal engaging portions 244 of the rigid frame member 236 engages the terminal lances 275. As the rigid frame member 236 extends from the conductor receiving surface 234 to the terminal lances 275 of the terminals 274, any force applied to the push portion 246 of the rigid frame member 236 will be translated through the rigid frame member 236 to the terminal 274. As the forces are translated through the rigid frame member 236, the seal 238 remains compressible to provide the sealing characteristics required.

With the terminal 274 and the terminal position assurance member 230 fully inserted, the latch projection securing sections 260 of the resilient arms 258 of latches 252 extend beyond the terminal position assurance receiving latching projections 218, thereby allowing the latching shoulders 264 of the latch projection securing sections 260 to cooperate with the latching shoulders 222 of the terminal position assurance receiving latching projections 218 to prevent the removal of the terminal position assurance member 230 from the electrical connector 210.

As the rigid frame member 236 extends from the conductor receiving surface 234 to the connector mating surface 232, any force applied to the conductor receiving surface 234 will be translated through the rigid frame member 236 to the terminal 274. As the forces are translated through the rigid frame member 236, the seal 238 remains compressible to provide the sealing characteristics required. Consequently, the terminal position assurance member 230 provides the rigidity required to properly position the terminals 274, while providing the sealing characteristic required to prevent the ingress of water, dust or other unwanted contaminates.

While the invention has been described with reference to a preferred embodiment, it will be understood by those skilled in the art that various changes may be made, and equivalents may be substituted for elements thereof without departing from the spirit and scope of the invention as defined in the accompanying claims. One skilled in the art will appreciate that the invention may be used with many modifications of structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. A terminal position assurance member for use with an electrical connector, the terminal position assurance member comprising:

- a rigid frame member extending from a conduct receiving surface of the terminal position assurance member to a connector mating surface;
- one or more compressible seals cooperating with the rigid frame member to provide sealing between the rigid frame member, a housing of the electrical connector and conductors inserted into the terminal position assurance member;
- the one or more seals include one or more interface seals and one or more rear seals;
- the rigid frame member has a main body portion with terminal receiving projections extending to the connector mating surface;
- the interface seals have openings dimensioned to fit around the terminal receiving projections to provide a watertight seal between the terminal receiving projections and the interface seal, outside perimeters of the interface seals dimensioned to be received in the electrical connector and cooperate with terminal walls of cavities in the electrical connector to provide a watertight seal between the terminal walls of the cavities and the interface seal;
- wherein any insertion force applied to the conductor receiving surface of the rigid frame member will be translated through the rigid frame member to one or more terminals of the electrical connector, allowing the one or more seals to remain compressible to provide the sealing characteristics required.

2. The terminal position assurance member as recited in claim 1, wherein interface seal receiving recesses extend around an outer periphery of the terminal receiving projections, terminal receiving passages extend through the terminal receiving projections.

3. The terminal position assurance member as recited in claim 1, wherein the rigid frame member has terminal engaging portions which extend to the connector mating surface and a push portion extending from the conductor receiving surface, a terminal receiving passage extends through the rigid frame member from the connector mating surface to the conductor receiving surface.

4. The terminal position assurance member as recited in claim 1, wherein rear seal receiving recesses extend from the terminal receiving projections to the conductor receiving surface.

5. The terminal position assurance member as recited in claim 4, wherein the rear seals are configured to be inserted into the rear seal receiving recesses.

6. The terminal position assurance member as recited in claim 4, wherein the rear seals have outside surfaces dimensioned to cooperate with walls of rear seal receiving recesses to provide a watertight seal between the walls of rear seal receiving recesses and the rear seal, conductor receiving openings extend through the rear seals, the conductor receiving openings have ribs which cooperate with the conductors to provide a watertight seal between the conductors and the rear seal.

7. The terminal position assurance member as recited in claim 1, wherein latches extend from side surfaces of the rigid frame member.

8. The terminal position assurance member as recited in claim 7, wherein the latches have mounting sections which are secured to the rigid frame member proximate the conductor receiving surface.

9. The terminal position assurance member as recited in claim 7, wherein the latches have resilient arms which extend to latch projection securing sections, the latch projection securing sections have latching shoulders.

10. A terminal position assurance member for use with an electrical connector, the terminal position assurance member comprising:

- a rigid frame member extending from a conduct receiving surface of the terminal position assurance member to a connector mating surface;
- one or more compressible seals cooperating with the rigid frame member to provide sealing between the rigid frame member, a housing of the electrical connector and conductors inserted into the terminal position assurance member;
- the rigid frame member has a crimping portion provided proximate the connector mating surface and an enlarged shoulder provided proximate the conductor receiving surface, a terminal receiving passage extends through the rigid frame member from the connector mating surface to the conductor receiving surface;
- wherein any insertion force applied to the conductor receiving surface of the rigid frame member will be translated through the rigid frame member to one or more terminals of the electrical connector, allowing the one or more seals to remain compressible to provide the sealing characteristics required.

11. The terminal position assurance member as recited in claim 10, wherein a push member cooperates with the terminal position assurance members, the push member has an engagement portion having slots for receiving conductors thereon.

12. The terminal position assurance member as recited in claim 10, wherein the one or more compressible seals is a seal having an outer portion and an inner portion.

13. The terminal position assurance member as recited in claim 12, wherein the outer portion is positioned about an outer circumference of a portion of the rigid frame member, the outer portion is dimensioned to fit over the rigid frame member to provide a watertight seal between the rigid frame member and the seal, an outside perimeter of the outer portion of the seal is dimensioned to be received in the electrical connector and cooperate with terminal walls of cavities in the electrical connector to provide a watertight seal between the terminal walls of the cavities and the seal.

14. The terminal position assurance member as recited in claim 12, wherein the inner portion of the seal is configured to be positioned in the terminal receiving passage of the rigid frame member, the inner portion has an outside surface dimensioned to cooperate with a wall of terminal receiving passage to provide a watertight seal between the wall of terminal receiving passage and the inner portion of the seal, conductor receiving openings are provided in the inner portion of the seal, the conductor receiving openings have ribs which cooperate with the conductors to provide a watertight seal between the conductors and the inner portion of the seal.

15. A terminal position assurance member for use with an electrical connector, the terminal position assurance member comprising:

a rigid frame member extending from a conduct receiving surface of the terminal position assurance member to a connector mating surface;

one or more compressible seals cooperating with the rigid frame member to provide sealing between the rigid frame member, a housing of the electrical connector and conductors inserted into the terminal position assurance member;

the rigid frame member has terminal engaging portions which extend to the connector mating surface and a push portion extending from the conductor receiving surface, a terminal receiving passage extends through the rigid frame member from the connector mating surface to the conductor receiving surface;

terminal receiving passage portions of the seal are configured to be positioned in the terminal receiving passages of the rigid frame member, the terminal receiving passage portions have outside surfaces which are dimensioned to cooperate with walls of terminal receiving passages to provide a watertight seal between the walls of terminal receiving passages and the terminal receiving passage portions of the seal;

wherein any insertion force applied to the conductor receiving surface of the rigid frame member will be translated through the rigid frame member to one or more terminals of the electrical connector, allowing the one or more seals to remain compressible to provide the sealing characteristics required.

16. The terminal position assurance member as recited in claim 15, wherein conductor receiving openings are provided in the terminal receiving passage portions of the seal, the conductor receiving openings have ribs which cooperate with the conductors to provide a watertight seal between the conductors and the terminal receiving passage portions of the seal.

17. The terminal position assurance member as recited in claim 16, wherein the terminal engaging portions of the rigid frame member engage terminal lances of the one or more terminals.

* * * * *